US009508221B2

(12) United States Patent
Boesen

(10) Patent No.: US 9,508,221 B2
(45) Date of Patent: Nov. 29, 2016

(54) GAMING SYSTEM ADAPTED TO RECEIVE BILL DATA AND TICKET DATA BASED ON A MINIMUM ACCEPTABLE DENOMINATION

(71) Applicant: Aristocrat Technologies Australia Pty Limited, North Ryde (AU)

(72) Inventor: John Leslie Boesen, Menai (AU)

( * ) Notice: Subject to any disclaimer, the term of this patent is extended or adjusted under 35 U.S.C. 154(b) by 61 days.

(21) Appl. No.: 14/107,775

(22) Filed: Dec. 16, 2013

(65) Prior Publication Data

US 2014/0106859 A1 Apr. 17, 2014

Related U.S. Application Data

(63) Continuation of application No. 11/744,691, filed on May 4, 2007, now Pat. No. 8,616,983.

(30) Foreign Application Priority Data

May 6, 2006 (AU) ................................ 2006902359

(51) Int. Cl.
*A63F 9/00* (2006.01)
*A63F 13/00* (2014.01)
*G07F 17/32* (2006.01)

(52) U.S. Cl.
CPC ........... *G07F 17/3244* (2013.01); *G07F 17/32* (2013.01); *G07F 17/3246* (2013.01); *G07F 17/3248* (2013.01)

(58) Field of Classification Search
CPC ........... G07F 17/3244; G07F 17/3246; G07F 17/3248
USPC ............................................... 463/25, 46, 47
See application file for complete search history.

(56) References Cited

U.S. PATENT DOCUMENTS 5,265,874 A 11/1993 Dickinson et al.
5,429,361 A 7/1995 Raven et al.
5,547,202 A 8/1996 Tsumura
B558,693 I5 12/1996 Bennett et al.
5,954,583 A 9/1999 Green
5,967,896 A 10/1999 Jorasch et al.
6,048,269 A 4/2000 Burns et al.
6,113,492 A 9/2000 Walker et al.
6,162,122 A 12/2000 Acres et al.

(Continued)

FOREIGN PATENT DOCUMENTS

AU 761822 11/1999
EP 0534718 3/1993

(Continued)

OTHER PUBLICATIONS

Statement of Grounds and Particulars in Support of Opposition in the Matter of Australian Patent Application 2007202381 in the name of Aristocrat Technologies Australia Pty Ltd and Opposition thereto by IGT, dated Sep. 8, 2008, 24 pages.

(Continued)

*Primary Examiner* — William H McCulloch, Jr.
(74) *Attorney, Agent, or Firm* — Armstrong Teasdale LLP

(57) ABSTRACT

A controller for a gaming machine, the controller adapted to receive data from a bill acceptor that may represent bill data or ticket data, the controller arranged to process the data and to output bill data to a game controller, and output ticket data to a ticket processing mechanism.

4 Claims, 3 Drawing Sheets

(56) References Cited

U.S. PATENT DOCUMENTS

Figure 1:
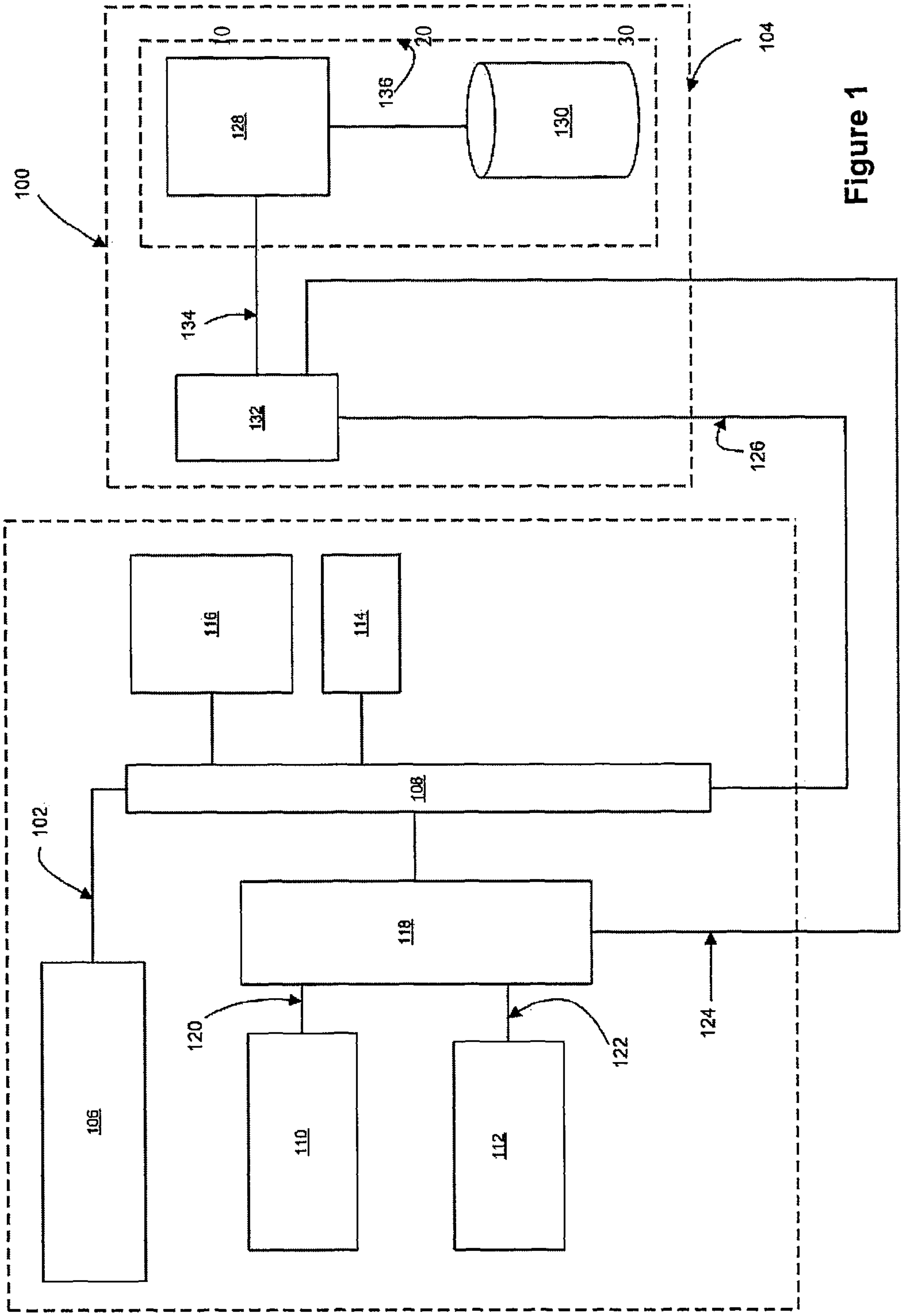

| | | | | |
|---|---|---|---|---|
| 6,213,877 | B1 | 4/2001 | Walker et al. | |
| 6,229,879 | B1 | 5/2001 | Walker et al. | |
| 6,315,662 | B1 | 11/2001 | Jorasch et al. | |
| 6,332,099 | B1 * | 12/2001 | Heidel et al. | 700/231 |
| 6,379,248 | B1 | 4/2002 | Jorasch et al. | |
| 6,511,377 | B1 | 1/2003 | Weiss | |
| 6,589,115 | B2 | 7/2003 | Walker et al. | |
| 6,676,515 | B1 | 1/2004 | Baltz et al. | |
| 6,682,423 | B2 | 1/2004 | Brosnan et al. | |
| 6,743,098 | B2 | 6/2004 | Urie et al. | |
| 6,846,238 | B2 | 1/2005 | Wells | |
| 6,852,029 | B2 * | 2/2005 | Baltz | G07F 17/32 463/25 |
| 6,896,619 | B2 | 5/2005 | Baltz et al. | |
| 7,004,837 | B1 | 2/2006 | Crowder, Jr. et al. | |
| 7,134,962 | B2 | 11/2006 | Meyerhofer et al. | |
| 7,139,694 | B2 | 11/2006 | Horn et al. | |
| 7,247,098 | B1 | 7/2007 | Bradford et al. | |
| 7,324,973 | B2 | 1/2008 | Taylor, III | |
| 7,351,142 | B2 | 4/2008 | Walker et al. | |
| 7,419,428 | B2 | 9/2008 | Rowe | |
| 7,594,855 | B2 | 9/2009 | Meyerhofer | |
| 7,641,555 | B2 * | 1/2010 | McKinley et al. | 463/43 |
| 7,771,271 | B2 * | 8/2010 | Walker | G07F 17/32 463/16 |
| 7,819,742 | B2 | 10/2010 | Chamberlain et al. | |
| 7,909,693 | B2 * | 3/2011 | Kammler | G07F 17/3225 463/16 |
| 8,052,522 | B2 | 11/2011 | Crivelli | |
| 8,197,334 | B2 | 6/2012 | Chudd et al. | |
| 8,202,164 | B2 | 6/2012 | Lechner et al. | |
| 8,282,473 | B2 | 10/2012 | Crivelli | |
| 8,323,103 | B2 | 12/2012 | Fabbri | |
| 8,360,892 | B2 | 1/2013 | Waxman et al. | |
| 8,616,983 | B2 * | 12/2013 | Boesen | 463/47 |
| 8,821,255 | B1 * | 9/2014 | Friedman | G07F 17/3255 463/25 |
| 2001/0050311 | A1 | 12/2001 | Avellino | |
| 2002/0070275 | A1 | 6/2002 | Mullins et al. | |
| 2002/0077178 | A1 | 6/2002 | Oberberger et al. | |
| 2002/0111206 | A1 * | 8/2002 | Van Baltz | G07F 17/32 463/17 |
| 2002/0128059 | A1 | 9/2002 | Baltz et al. | |
| 2002/0155887 | A1 | 10/2002 | Criss-Puszkiewicz et al. | |
| 2002/0160834 | A1 | 10/2002 | Urie et al. | |
| 2003/0050111 | A1 | 3/2003 | Saffari | |
| 2003/0060256 | A1 * | 3/2003 | Joshi | 463/16 |
| 2003/0176210 | A1 | 9/2003 | Vancura | |
| 2003/0220138 | A1 | 11/2003 | Walker et al. | |
| 2004/0043814 | A1 | 3/2004 | Angell et al. | |
| 2004/0053684 | A1 | 3/2004 | Chudd et al. | |
| 2004/0162131 | A1 | 8/2004 | Shuster | |
| 2005/0059466 | A1 | 3/2005 | Yarbrough | |
| 2005/0143166 | A1 | 6/2005 | Walker et al. | |
| 2005/0148387 | A1 | 7/2005 | Baltz et al. | |
| 2005/0197183 | A1 * | 9/2005 | Walker et al. | 463/25 |
| 2005/0215316 | A1 | 9/2005 | Rowe et al. | |
| 2005/0215325 | A1 | 9/2005 | Nguyen et al. | |
| 2005/0233797 | A1 | 10/2005 | Gilmore et al. | |
| 2005/0282626 | A1 | 12/2005 | Manfredi et al. | |
| 2006/0016883 | A1 * | 1/2006 | Silva et al. | 235/381 |
| 2006/0079315 | A1 * | 4/2006 | Okada | 463/25 |
| 2006/0111168 | A1 | 5/2006 | Nguyen et al. | |
| 2006/0166732 | A1 | 7/2006 | Lechner et al. | |
| 2006/0178208 | A1 | 8/2006 | Cole | |
| 2006/0205482 | A1 | 9/2006 | Crivelli | |
| 2007/0207850 | A1 | 9/2007 | Darrah et al. | |
| 2007/0246531 | A1 * | 10/2007 | Dabrowski | 235/381 |
| 2007/0298869 | A1 | 12/2007 | Boesen | |
| 2008/0026823 | A1 | 1/2008 | Wolf et al. | |
| 2008/0026825 | A1 * | 1/2008 | Yoshioka | 463/25 |
| 2008/0132308 | A1 | 6/2008 | Muir et al. | |
| 2012/0135808 | A1 | 5/2012 | D'Amico et al. | |
| 2013/0122997 | A1 | 5/2013 | Carr-Greg | |
| 2013/0137509 | A1 | 5/2013 | Weber | |
| 2013/0172071 | A1 | 7/2013 | Tarantino et al. | |
| 2014/0038699 | A1 * | 2/2014 | Lui | G07F 17/32 463/25 |
| 2014/0106859 | A1 * | 4/2014 | Boesen | 463/25 |
| 2015/0034451 | A1 * | 2/2015 | Takeda | 194/207 |

FOREIGN PATENT DOCUMENTS

| | | |
|---|---|---|
| EP | 0589545 | 3/1994 |
| WO | 91/16416 | 10/1991 |
| WO | 9412953 | 6/1994 |
| WO | 9812648 | 3/1998 |
| WO | 01/84516 | 11/2001 |
| WO | 2005072330 | 8/2005 |
| WO | 2005082480 | 9/2005 |
| WO | 2008127870 | 10/2008 |

OTHER PUBLICATIONS

Statement of Grounds and Particulars in Support of Opposition in the Matter of Australian Patent Application 2004248208 in the name of Aristocrat Technologies Australia Pty Ltd and Opposition thereto by IGT, dated May 29, 2008, 20 pages.

International Search Report and Written Opinion corresponding to International Application No. PCT/AU2004/000799, mailed Jul. 28, 2004.

* cited by examiner

GAMING SYSTEM ADAPTED TO RECEIVE BILL DATA AND TICKET DATA BASED ON A MINIMUM ACCEPTABLE DENOMINATION

RELATED APPLICATIONS

This application is a continuation of U.S. patent application Ser. No. 11/744,691, filed May 4, 2007, which claims priority to an Australian patent application filed on May 5, 2006, as serial number AU2006902359, entitled "A Gaming Machine, a Controller for a Gaming Machine, a Gaming System, and a Gaming Method". The above-identified applications are hereby incorporated herein by reference in their entirety.

FIELD OF THE INVENTION

The present invention relates generally to the field of gaming machines.

BACKGROUND OF THE INVENTION

Many of today's gaming (slot) machines are fitted with ticket dispensing facilities. When a person using such a gaming machine wishes to cash-in game credits on a machine the person can press the "collect" button on the machine, which in turn causes the machine to issue the person with a ticket. The ticket has printed material (such as, for example, a bar code). Once a person has been issued with a ticket, they can present it to a cashier, who will in turn process the ticket and give the person the appropriate monies. The monies paid to the person are equivalent to the monetary value of the game credits accrued on the gaming machine when the collect button was pressed.

Unfortunately, many currently installed gaming machines are only capable of dispensing tickets. Consequently, a person wishing to change from one machine to another has to go through the aforementioned process of obtaining a ticket redeeming the ticket for money and then subsequently inserting that money into another machine to obtain game credits. The task of moving monies between gaming machines can be time consuming and annoying to persons that switch between different gaming on a relatively frequent basis.

DEFINITIONS

Throughout this specification the following terms are to be interpreted as having the following meanings:

Bill—is legal monetary tender in the form of a paper or polymer note—as opposed to coins—such as, for example, a $5.00 bill.

Ticket—is a paper (or other suitable substrate material) ticket issued by a gaming machine that has printed material (such as a barcode) thereon which is associated with a monetary value.

SUMMARY OF THE INVENTION

According to a first aspect of the present invention there is provided a controller for a gaming machine, the controller adapted to receive data from a bill acceptor that may represent bill data or ticket data, the controller arranged to process the data and to:

(a) output bill data to a game controller; and (b) output ticket data to a ticket processing mechanism.

In an embodiment there is provided a controller further adapted to receive remainder data from the ticket processing mechanism and control a printer to print a ticket having a value specified by the remainder data.

According to a second aspect of the present invention there is provided a gaming machine comprising:

a bill acceptor adapted to output data containing bill data when a bill is inserted and ticket data when a ticket is inserted; and a controller arranged to process data from the bill acceptor and to:

(a) output bill data to a game controller; and (b) output ticket data to a ticket processing mechanism.

In an embodiment there is provided a gaming machine further comprising a ticket printer, and wherein the controller is adapted to receive remainder data from the ticket processing mechanism and control the printer to print a ticket having a valued specified by the remainder data.

According to a third aspect of the present invention there is provided a gaming system comprising:

a game controller;

a ticket processing mechanism;

a bill acceptor that outputs data containing bill data when a bill is inserted and ticket data when a ticket is inserted; and a controller arranged to process the data from the bill acceptor and to:

(a) output bill data to the game controller; and (b) output ticket data to the ticket processing mechanism.

In an embodiment the ticket processing mechanism is configured to process the ticket data and determine whether the ticket data is valid ticket data.

In an embodiment there is provided a gaming system wherein the ticket processing mechanism is arranged to process valid ticket data to form credit data and output the credit data to the game controller.

In an embodiment the gaming system further comprises a ticket printer, and the controller is adapted to receive remainder data from the ticket processing mechanism and control the printer to print a ticket having a valued specified by the remainder data.

In an embodiment the ticket processing mechanism is arranged to process the valid ticket data based on a minimum denomination of the game controller to produce credit data and remainder data having a combined value corresponding to the value of the valid ticket data.

In an embodiment the ticket processing mechanism comprises a server for validating the ticket data and a client for processing the ticket data.

In a fourth aspect of the invention there is provided a method of processing data comprising:

processing data from a bill acceptor to determine whether the data includes bill data or ticket data, outputting bill data to a game controller and outputting ticket data to a ticket processing mechanism.

In an embodiment the method comprises processing said ticket data to determine whether it is valid.

In an embodiment the method comprises processing valid ticket data to form credit data and outputting said credit data to the game controller.

In an embodiment the method comprises processing the valid ticket data to produce credit data and remainder data based on a minimum denomination of the game controller, the credit data and remainder data having the same combined value as the ticket data.

In an embodiment the method comprises printing a ticket having a value specified by said remainder data.

According to a fifth aspect of the present invention there is provided a system for use with a gaming machine, the system comprising an electronic processing part that is arranged to perform the steps of:

processing data generated by a bill acceptor of the gaming machine to determine whether a bill or ticket has been inserted into the bill acceptor;

issuing a bill insertion message to an electronic gaming controller of the gaming machine in response to determining that the bill has been inserted into the bill acceptor; and issuing a ticket insertion message to be processed at least in part by a head system that is remote to the gaming machine in response to determining that the ticket has been inserted into the bill acceptor.

Preferably, the electronic processing part is further arranged to cause the printer to print another ticket, that is associated with a first monetary value, that is less than a second monetary value associated with the ticket.

According to a sixth aspect of the present invention there is provided a method for use with a gaming machine, the method comprising the steps of:

processing data generated by a bill acceptor of the gaming machine to determine whether a bill or ticket has been inserted into the bill acceptor;

issuing an electronic gaming controller of the gaming machine with a bill insertion message in response to determining that the bill has been inserted into the bill acceptor; and issuing a ticket insertion message to be processed at least in part by a head system that is remote to the gaming machine in response to determining that the ticket has been inserted into the bill acceptor.

Preferably, the method further comprises the step of issuing a printer with a print ticket message to cause the printer to print another ticket that is associated with a first monetary value that is less than a second monetary value associated with the ticket.

An advantage of embodiments of the invention is that they enable a gaming machine to process the ticket and apply the appropriate game credits even though the gaming controller is not able to process tickets. Thus, a person playing the gaming machine need not go through the time consuming and potentially annoying process of obtaining a ticket from the machine and then going to the cashier with the ticket to obtain their monies.

An advantage of those embodiments where a ticket is printed is that they facilitate the scenario where the gaming machine accepts, for example, $1.00 denominations only but a person inserts a ticket with the value of, for example, $1.67. Being able to print a ticket allows $1.00 to be credited on the gaming machine and print a ticket with a value of $0.67. The $0.67 ticket could, for example, be inserted into a $0.01 machine or presented to the cashier to collect $0.67. Thus, by utilising embodiments of the invention vendors can retrofit gaming machines to support insertion of tickets at a fraction of the cost of replacing the gaming machine.

A BRIEF DESCRIPTION OF THE DRAWINGS

Figure 2:
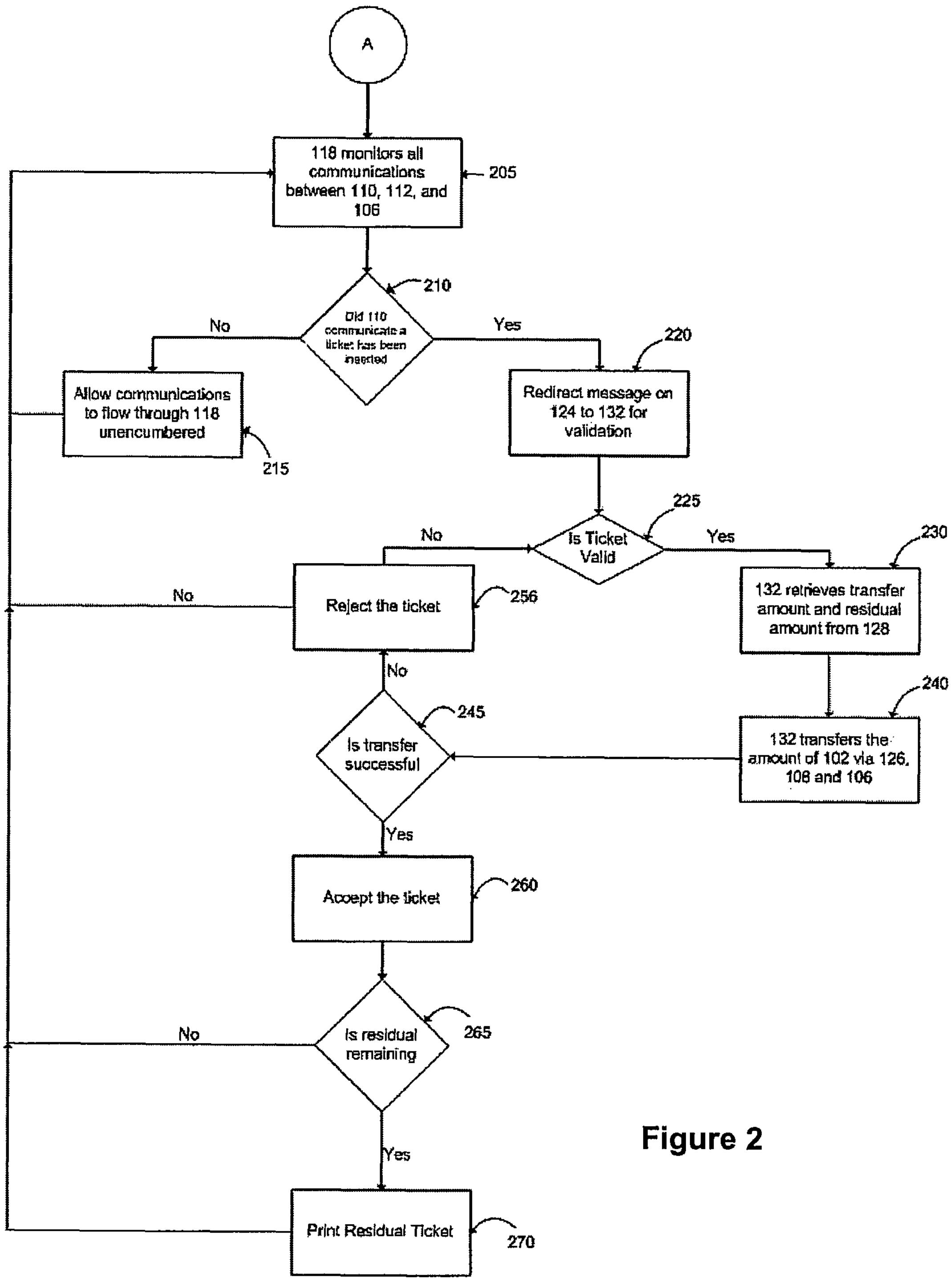
Figure 3:
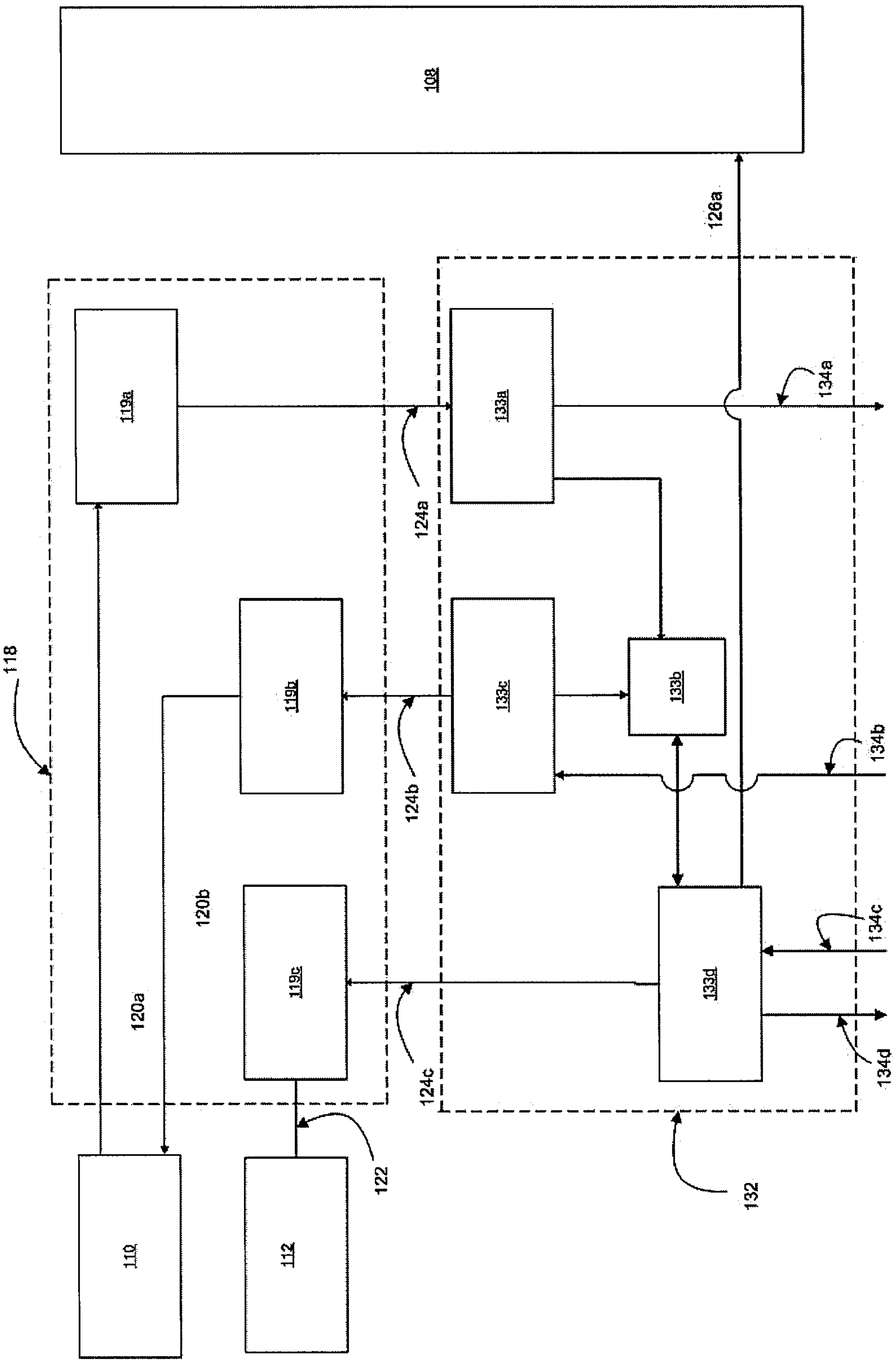

Notwithstanding any other embodiments that may fall within the scope of the present invention, certain embodiments of the present invention will now be described, by way of example only, with reference to the accompanying figures, in which:

FIG. 1 provides a schematic diagram of a gaming system that includes an embodiment of the present invention;

FIG. 2 provides a flow chart of various steps performed in an embodiment of the present invention; and FIG. 3 is a schematic diagram showing additional detail of some of the components of FIG. 1 in accordance with an embodiment of the present invention.

DETAILED DESCRIPTION

Referring to FIG. 1, which is a block diagram of a system 100 embodying the present invention, the system 100 includes at least one electronic gaming machine 102 (EGM) in the form of a typical slot machine that is produced by companies such as Aristocrat Technologies Australia Pty Ltd, and retrofit system 104 based on the same principle as the system 6000 product from Aristocrat Technologies Australia Pty Ltd for remote credit transfer.

The electronic gaming machine 102 comprises several components including: a gaming board 106; a backplane 108 (that is, a data bus); a bill acceptor 110; a thermal printer 112; a button panel 114; a video monitor 116; and an electronic controller 118. The gaming board 106 is electrically coupled to the backplane 108. The bill acceptor 110 and the thermal printer 112 are electrically coupled to the electronic controller. Thus, the gaming board 106 is in data communication with the bill acceptor 110 and the thermal printer 112 via the backplane 108 and controller 118. A thermal printer is preferred because tickets they print work well with bill acceptors. However, persons skilled in the art will appreciate that other types of printers may be used or indeed that a thermal printer may be provided in addition to an existing printer. The button panel 114 and the video monitor 116 are also coupled (electrically) to the backplane 108. The electronic controller 118 is electrically connected to the bill acceptor 110 and the thermal printer 112 via any appropriate links such as serial RS232 links 120 and 122. The electronic controller 118 is also electrically connected to the backplane 108 and further connected to the retrofit system 104 via a serial RS232 link 124. It is noted that the backplane 108 is electrically connected to the retrofit system 104 via an appropriate data communication link 126, for example one that supports the x-series protocol, which is a protocol used in New South Wales, Australia.

The gaming board 106 is essentially a computer motherboard and is installed with a memory device (such as an EPROM) that contains one or more game programmes such as Queen of the Nile from Aristocrat Technologies Australia Pty Ltd. Persons skilled in the art will readily appreciate that the gaming board 106 executes the one or more game programmes stored in the memory device and thus provides an electronic game controller. The button panel 114 and the video monitor 116 enable persons to interact with the games. More specifically, the button panel 114 allows persons to operate the games, while the video monitor presents the game to the persons.

As mentioned previously, the system 100 includes a retrofit system 104 in the form of a modified system 6000 product from Aristocrat Technologies Australia Pty Ltd. The retrofit system of the preferred embodiment provides a ticket processing mechanism that allows an inserted ticket to be processed in a manner such that this is not apparent to the gaming board 106. The retrofit system 104 essentially comprises a personal computer 128 and a database 130 that provides a head system 136, and an electronic control unit 132. Although shown as separate to the gaming machine in FIG. 1, the electronic control unit may be provided in a number of locations but is typically provided within the electronic gaming machines casing on a separate circuit board. The electronic control unit 132 may be referred to as a "Ticket Client" as it is a client to the head system that is the "Ticket Master". The retrofit system 104 also includes a data communication link 134 which may be in the form of an RS485 link or another appropriate link such as Ethernet, which is electrically coupled to the personal computer 128 of the head system 136 and the electronic control unit 132 to allow data to be exchanged therebetween. The data link 124, which is electrically coupled to the controller 118, is electrically connected to the control unit 132 to allow the controller 118 and the control unit 132 to exchange data with each other. The data link 126, which is electrically connected to the backplane 108, is also electrically connected to the electronic control unit 132.

The system 100 is distinguishable over similar existing systems in that it includes the controller 118 in the gaming machine 102, which is not present in existing gaming machines. Furthermore, the control unit 132 of the retrofit system 104 provides additional functionality not provided in similar existing retrofit systems. With regard to the controller 118, which is in the form of a microprocessor (or microcontroller) based electronic board, it is arranged to monitor data messages generated by the bill acceptor 110. In particular, when a person inserts a bill (such as $5.00 or $10.00 note) or a ticket into the bill acceptor 110 the bill acceptor 110 will generate data that is received by the controller 118 via the data link 120. As shown in FIG. 3 on receiving the data, the bill acceptor data processor 119*a* of the controller 118 will process the data to determine whether a bill or a ticket has been inserted into the bill acceptor 110 (that is to determine whether it is bill or ticket data). That is, the data generated by the bill acceptor 110 will include data indicating whether a bill or ticket has been inserted into the bill acceptor 110.

If on processing the data generated by the bill acceptor 110 the processor 119*a* of controller 118 determines that a bill has been inserted into the bill acceptor 110, processor 119*a* of the controller 118 places a bill insertion message onto the backplane 108. That is, the controller outputs (or issues) a bill insertion message including the bill data to the gaming board via the backplane. On detecting the presence of the bill insertion message, the gaming board 106 will give the player the amount of game credits equivalent to the bill inserted into the bill acceptor 110. On the other hand if on processing the data from the bill acceptor 110 the processor 119*a* of controller 118 determines that a ticket has been inserted into the bill acceptor 110, the controller 118 will issue the control unit 132 with a ticket insertion message 124*a* via the link 124. That is, the controller outputs (or issues) a ticket insertion message including the ticket data to the control unit 132 of the ticket processing mechanism.

On receiving the ticket insertion message the control unit 132 communicates with the personal computer 128 which acts as a server (just as the control unit 132 acts as a client) (via link 134) to seek confirmation that the ticket inserted into the bill acceptor 110 is valid. In this regard, the ticket has a barcode printed thereon and the information encoded in the barcode is contained in the ticket insertion message. The information related to the barcode that is in the ticket insertion message is provided to the personal computer 128 by a ticket insertion message processor 133*a* of the control unit 132 so that the ticket can be verified when the personal computer 128 is 'asked' 134*a* by the control unit 132 to verify the ticket, it checks the database 130 for the existence of a record that corresponds to the information in the ticket insertion message. The ticket insertion message processor also stores the ticket insertion message in memory 133*b*. The memory may be persistent so that in the event of a power failure it is possible to determine the state immediately before power loss occurred and take the necessary actions to cleanup or complete the transaction.

Subsequent to checking the database 130 the personal computer 128 will inform the control unit 132, by way of sending an electronic message, of the existence of a corresponding record. If the electronic message 134*b* received from the personal computer 128 indicates that no corresponding record exists, an invalid ticket handler 133*c* of the control unit 132 will assume that the ticket is invalid and instruct (by sending an electronic message 124*b* via link 124) the controller 118 accordingly, the control unit will also clear the message from memory 133*b*. An invalid ticket handler 119*b* of the controller 118 will in turn instruct the bill acceptor 110 to reject the ticket. On the other hand, if the personal computer 128 determines that a corresponding record exists in the database 130 it will advise the control unit 132 accordingly (by sending an electronic message 134*c* via link 134), which in effect is an indication that the ticket is valid and which also contains the value of the ticket. In response, a credit processor places a game credit message 126*a* containing credit data onto the backplane 108 via link 126 that defines the correct amount of credit. On detecting the game credit message, the gaming board 106 will provide the appropriate number of game credits in the same way as if a bill had been inserted into the bill acceptor 110.

In addition to placing the game credit message onto the backplane 108, the credit processor 133*d* of control unit 132 may issue a print ticket message 124*c* containing remainder data to the controller 118 via the link 124. The remainder data specifies the difference in value between the credit data and the original ticket data. On receiving the print ticket message 124*c*, the controller 118 will instruct the printer 112 to print a ticket sending the print ticket message on to the printer 112 via the link 122. If the credit processor control unit 132 issues the print ticket message 124*c*, it will also inform the personal computer 128 that the message 124*c* has been issued. The personal computer 128 will intern make a record of the ticket in the database 130 so that if that particular ticket is inserted into the bill acceptor 110 at a later date (or any other ticket reading device, such as one that might be used by a cashier) the ticket can be verified as previously described.

The advantage of allowing the control unit 132 to be able to effect the printing of a ticket is that, for example, if the ticket has a value of $1.67 and the gaming machine only accepts $1.00 denominations, the game credit message issued by the control unit can be for the value of $1.00, while the remaining $0.67 can be issued on a ticket. The $0.67 ticket could subsequently be inserted into a $0.01 gaming machine to obtain 67 game credits or redeemed for money at a cashier. Accordingly, the credit processor 133*d* is configured to split the value of the ticket based on the minimum acceptable denomination of gaming machine 102.

A person skilled in the art will appreciate from the above description that the gaming board 106 which provides an electronic gaming controller for control of a play of games will not be aware of the existence of the electronic controller 118.

A person skilled in the art will also appreciate that while the functions 119*a*, 119*b*, 119*c* performed by the electronic controller 118 and the functions performed by the control unity 132, 133*a*, 133*c*, 133*d* are shown as separate functional components, these may in fact be separate subroutines of program code executed by the controller 118 and the control unit 132. Further persons skilled in the art will appreciate that the functions of the electronic controller 118 and the electronic control unit 132 could be merged into a single device.

The main aforementioned steps performed by the controller 118 and the control unit 132 are illustrated in the flow chart 200 in FIG. 2. At step 205, the controller 118 monitors all communication between the bill acceptor, the printer and the gaming board. Most communications pass through but others are intercepted, in particular ticket insertion messages received from the bill acceptor 110. Thus at step 210 it determines whether the bill acceptor has communicated that a ticket has been inserted. If the answer is no it allows communications to flow through to the gaming board 106 without interfering. That is it outputs the message previously provided by the bill acceptor 112 to the gaming board 106 via backplane 108. If at step 210 the answer is yes, the electronic controller 118 intercepts the message and outputs it via link 124 to electronic control unit 132 for validation. At step 225 the electronic control unit 132 determines whether the ticket is valid by querying the head system 136 at step 220. If it receives an invalid ticket response from the head system 136 it rejects the ticket at step 250. If it receives a message that the ticket is valid from the head system 136, the electronic control unit 132 retrieves the value of the ticket, determines the credit amount and the remainder amount. At step 240 the credit amount is transferred to the backplane 108 where it is picked up by the gaming board. The remainder amount is transferred to the electronic controller 118. Accordingly, assuming the transfer is determined to be successful at step 245 the ticket is accepted at 260 and if a remainder amount is remaining as determined at step 265 a ticket for the remainder amount is printed at step 270. The method then returns to the monitoring state 205.

While the present invention has been described with reference to the aforementioned embodiment, it will be understood by those skilled in the art that alterations, changes and improvements may be made and equivalents may be substituted for the elements thereof and steps thereof without departing from the scope of the present invention. In addition, many modifications may be made to adapt to a particular situation or material to the teachings of the present invention without departing from the central scope thereof. Such alterations, changes, modifications and improvements, though not expressly described above, are nevertheless intended and implied to be within the scope and spirit of the invention. Therefore, it is intended that the invention not be limited to the particular embodiments disclosed as the embodiment for carrying out this invention, but that the invention will include all embodiments falling within the scope of the independent claims.

The invention claimed is:

1. A method of monetary ticket use with a first gaming machine having a first gaming machine denomination and a second gaming machine having a second gaming machine denomination, the first gaming machine being retrofitted with a ticket processing mechanism in communication with an existing game controller of the first gaming machine, the ticket processing mechanism including a control unit, and the first gaming machine having a bill acceptor and a printer that maintain communication with the existing game controller, and a gaming board, the method comprising:

receiving a first ticket entered into the bill acceptor, the first ticket including ticket data associated with a monetary value for establishing game credits to provide a wager on the first gaming machine;

transmitting a ticket insertion message from the bill acceptor to the existing game controller, the ticket insertion message including the ticket data;

transmitting the ticket insertion message from the existing game controller to the control unit;

receiving the ticket insertion message at the control unit;

producing, by the control unit, game credit data and remainder data from the ticket data, the game credit data indicating a first monetary value that is at least equal to the first gaming machine denomination, the remainder data indicating a second monetary value that is less than the first gaming machine denomination, wherein the game credit data and the remainder data have a same combined value as the monetary value, wherein the second monetary value is at least the second gaming machine denomination;

transmitting, by the control unit to the gaming board, a game credit message defining a number of game credits based on the game credit data;

transmitting, by the control unit to the existing game controller, a print ticket message including the remainder data;

transmitting, by the existing game controller to the printer, the print ticket message; and printing, by the printer, a second ticket including the remainder data.

2. A method as claimed in claim 1, and further comprising processing the ticket data to detect a record in a database that corresponds to information obtained from the ticket data.

3. A ticket redemption system for use with a first gaming machine having a first gaming machine denomination and a second gaming machine having a second gaming machine denomination, the first gaming machine being retrofitted with a ticket processing mechanism in communication with an existing game controller of the first gaming machine, the system comprising:

a bill acceptor, at the first gaming machine, that maintains communication with the existing game controller, the bill acceptor configured to:

accept a first ticket and paper money associated with a first monetary value for establishing game credits to provide a wager;

generate ticket data including the first monetary value upon receipt of the first ticket; and transmit a ticket insertion message to the existing game controller, the ticket insertion message including the ticket data; and the ticket processing mechanism comprising a control unit configured to:

receive the ticket insertion message from the existing game controller;

produce, from the ticket data, game credit data and remainder data based on the first gaming machine denomination, the game credit data and the remainder data indicating a same combined value as the first monetary value; and transmit a print ticket message to the existing game controller, the print ticket message including the remainder data, the print ticket message configured to cause printing of a second ticket including the remainder data by a printer that maintains communication with the existing game controller, wherein the second ticket is redeemable at the second gaming machine, and wherein the remainder data has a second monetary value of at least the second gaming machine denomination.

4. A system as claimed in claim 3, wherein the control unit of the ticket processing mechanism at the first gaming machine is further configured to process the ticket data to detect a record in a database on a server that corresponds to information obtained from the ticket data.

* * * * *